Jan. 15, 1924. 1,480,671
E. T. CURRAN
MEANS FOR VARYING THE TEMPERATURE OF THE ATMOSPHERE IN A CHAMBER
Filed Dec. 6, 1920
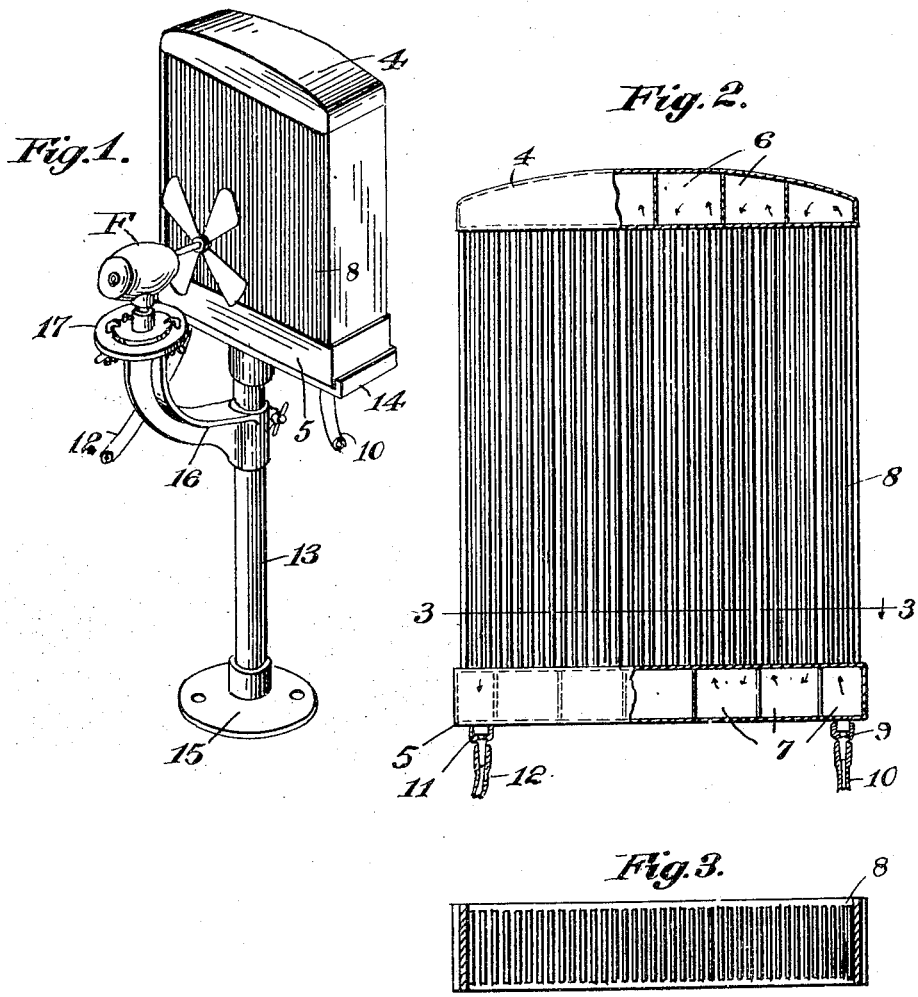

Patented Jan. 15, 1924.

1,480,671

UNITED STATES PATENT OFFICE.

EDWARD T. CURRAN, OF DETROIT, MICHIGAN.

MEANS FOR VARYING THE TEMPERATURE OF THE ATMOSPHERE IN A CHAMBER.

Application filed December 6, 1920. Serial No. 428,781.

*To all whom it may concern:*

Be it known that I, EDWARD T. CURRAN, a citizen of the United States, and a resident of the city of Detroit, in the county of Wayne and State of Michigan, have invented certain new and useful Improvements in Means for Varying the Temperature of the Atmosphere in a Chamber, of which the following is a specification.

This invention relates to means for changing or varying the temperature of the atmosphere in a chamber, room or the like, and it is the object of the invention to provide an apparatus for this purpose which is primarily adapted for use as a refrigeratory to reduce the temperature of the atmosphere, although it may be used to raise the temperature, and to provide apparatus for this purpose which is simple and cheap in structure and highly efficient in use.

In carrying out the invention I provide an element through which a medium having a temperature different from the temperature of the atmosphere in a chamber, such as water, is adapted to circulate, and provide means, such as an electric motor driven fan, to circulate the atmosphere in the chamber about said element, and supporting said element and fan to have adjustment relative to each other.

In the drawing accompanying and forming a part of this specification Figure 1 is a perspective view of apparatus showing an embodiment of my invention.

Figure 2 is an enlarged front elevation of a core being partly in section to show the circulation of the water therethrough; and Figure 3 is a sectional view taken substantially on the line 3—3 of Figure 2.

Similar characters of reference designate like parts throughout the different views of the drawing.

The embodiment of my invention shown in the drawing comprises an element to be placed in a chamber or room the temperature of the atmosphere of which it is desired to change, said element being arranged for the circulation therethrough of a medium having a temperature different from the temperature of the atmosphere in the chamber, or said medium may be contained in said element, said element in the present instance being in the nature of a multitubular member and comprising a pair of tanks 4, 5 supported in spaced relation, each tank being divided into separate chambers as shown at 6 and 7, juxtaposed and spaced tubes 8 being connected at opposite ends to the chambers of said tanks to constitute the core of said element, and the chambers of the tanks are so arranged and the tubes connected thereto whereby certain of the tubes will be in communication with one chamber of one tank and a pair of chambers of the opposite tank providing a continuous and circuitous passage of the medium through said element. To connect said element in circulation with a source of the medium, to circulate therethrough one of the chambers of one tank, in the present instance the chamber at the extreme right of tank 7, has an inlet 9 which is arranged for the connection of a conduit 10 for connection to the source of supply. An outlet is also provided for said medium and is in the present instance shown as leading from the chamber at the extreme left of the tank 7, as shown at 11, and arranged for the connection of a conduit 12 to lead the medium back to the source of supply or to a waste pipe. The tubes 8 may be of suitable shape and are shown as being flat and of less width from side to side than from the front to the rear as clearly shown in Figure 3.

When it is desired to reduce the temperature of the atmosphere of the chamber this element is in the nature of a refrigeratory, and when utilized for this purpose the inlet 9 may be connected to a source of cold water supply, such as a water main, and the outlet 11 is connected to a waste pipe. Should it be desired to increase or raise the temperature of the atmosphere in the chamber the medium circulating through said element has a higher temperature than the temperature of the atmosphere in the chamber, as by connecting said element to a source of hot water supply. To cause a change in all of the atmosphere of the chamber or room means are provided to set the atmosphere in circulation in the chamber and cause the same to circulate about said element, said means being shown as consisting of an electric motor driven fan, indicated in a general way at F, this fan being arranged adjacent to said element to cause the atmosphere to forcibly strike against said element, it having been found that the force with which an air blast or air currents strike against an object is an important factor in such air taking up or absorbing the temperature of such object whether of a higher or lower temperature than the air striking against the object, the temperature of such air being increased or raised when the object is of a higher temperature than the air, and the temperature of the air being lowered when the temperature of such object is lower than the temperature of the air.

To support said element a standard 13 is provided upon the upper end of which a shelf 14 is mounted, or the element may be arranged for direct connection to said standard. The standard is mounted upon a base 15 which may have openings for screws for securing the support in fixed position. A fan supporting arm 16 is arranged to be mounted upon the standard for slidable adjustment, said arm having a table 17 to which the fan is clamped, the fan motor support being arranged with the usual adjustment to change the direction of the air blast from the fan. By the adjustment of the fan motor and the fan support upon the standard the air blast from the fan may be directed against said element from different angles, and such blast after circulating about said element directed to different portions of the chamber.

Variations may be resorted to within the scope of my invention and portions of the invention may be used without others.

Having thus described my invention I claim:

1. In means for changing the temperature of the atmosphere in a chamber, an element to be placed in said chamber for the circulation of a medium therethrough of a temperature different from the temperature of the atmosphere in the chamber and about which the atmosphere of the chamber is circulated, said element comprising spaced tanks, said tanks being arranged with transverse partitions to divide the tanks into juxtaposed chambers, tubes connected at opposite ends to the chambers of the tanks and arranged so that one tube will communicate with a chamber of one tank and the successive chamber of the other tank, and an inlet leading to the chamber at one end of a tank and outlet leading from the chamber at the opposite end of said tank.

2. In means for changing the temperature of the atmosphere in a chamber, an element to be placed in said chamber for the circulation of a medium therethrough having a temperature different from the temperature of the atmosphere in the chamber, said element comprising a pair of spaced tanks, each tank being separated into juxtaposed chambers, tubes connecting the chambers of the tanks into a continuous and circuitous passage, an inlet and an outlet for the medium to circulate through said element, said inlet leading to the chamber at one end of one tank and the outlet leading from the chamber at the other end of said tank, and means to cause the atmosphere of the chamber to circulate about said element for the purpose specified.

Signed at New York city, in the county of New York, and State of New York this 13th day of November, 1920.

EDWARD T. CURRAN.